(12) United States Patent
Graham et al.

(10) Patent No.: US 6,999,417 B1
(45) Date of Patent: Feb. 14, 2006

(54) DEVICES, SOFTWARES AND METHODS FOR INCORPORATING BURSTINESS OF PACKET LOSS METRIC IN QOS BASED NETWORK ROUTING

(75) Inventors: Philip R. Graham, Milpitas, CA (US); Ramanathan T. Jagadeesan, San Jose, CA (US); Bich Tu Nguyen, Los Altos, CA (US)

(73) Assignee: Cisco Technology, Inc., San Jose, CA (US)

(*) Notice: Subject to any disclaimer, the term of this patent is extended or adjusted under 35 U.S.C. 154(b) by 951 days.

(21) Appl. No.: 09/998,866

(22) Filed: Nov. 30, 2001

(51) Int. Cl.
*H04J 1/16* (2006.01)
*H04J 3/14* (2006.01)

(52) U.S. Cl. ....................... 370/230; 370/235
(58) Field of Classification Search ............... None
See application file for complete search history.

(56) References Cited

U.S. PATENT DOCUMENTS

| | | | |
|---|---|---|---|
| 5,153,877 A * | 10/1992 | Esaki et al. ............ 370/389 |
| 6,073,180 A * | 6/2000 | Onoda et al. ............ 709/234 |
| 6,167,051 A * | 12/2000 | Nagami et al. ............ 370/397 |
| 6,285,658 B1 * | 9/2001 | Packer .................... 370/230 |
| 6,674,718 B1 * | 1/2004 | Heddes et al. ............ 370/230 |
| 6,816,464 B1 * | 11/2004 | Scott et al. ............... 370/252 |
| 6,920,109 B1 * | 7/2005 | Yazaki et al. ............ 370/230.1 |
| 2005/0152339 A1 * | 7/2005 | Scott et al. ............... 370/352 |

* cited by examiner

*Primary Examiner*—Ajit Patel
*Assistant Examiner*—Chirag Shah
(74) *Attorney, Agent, or Firm*—Marger Johnson & McCollom, P.C.

(57) ABSTRACT

Devices, software, and methods quantify a burstiness quality of the packet loss in the node of a path. The quantified burstiness becomes a metric for determining the Quality of Service (QoS) offered by a node in retransmitting data through a network. Network routing and rerouting decisions are made according to the improved QoS. The burstiness statistic is determined by counting lengths of episodes of sequentially discarded packets at the node. The burstiness statistic is incorporated as a metric with the other metrics of the QoS of the node.

72 Claims, 5 Drawing Sheets

☐ STORED & RETRANSMITTED

☒ DISCARDED (QUEUE FULL)

DEVICES, SOFTWARES AND METHODS FOR INCORPORATING BURSTINESS OF PACKET LOSS METRIC IN QOS BASED NETWORK ROUTING

BACKGROUND OF THE INVENTION

1. Field of the Invention

The present invention is related to the field of routing algorithms through networks, and more specifically to devices, software and methods of network routing based on Quality of Service that accounts for the nature of packet loss.

2. Description of the Related Art

Networks, such as the internet, are increasingly used for transmitting voice data and image data. Network transmission is now described in more detail.

Referring to FIG. 1, a network 120 is shown having nodes A, B, C, D, E, F, G, H, I, J, K, L, M, N, P, Q, R. Between some (but not all) pairings of these nodes there are communication links. It will be appreciated that the links are intimately associated with the nodes they terminate in.

At each one of these nodes there is a network router, or switch, etc. An example is described below.

Referring to FIG. 2 a router 210 at node of FIG. 1 is described. Router 210 has a central Processing Unit (CPU) 220 and a memory 230. Memory 230 is controlled by CPU 220. Memory 230 is also called a queue, and typically has a certain capacity.

Packets arrive at node N from any source, and are stored in memory 230. Then they are retransmitted from memory 230. The packets arrive and are stored in a sequence, but may be retransmitted according to a different sequence, depending on their priority. Ordinarily the stored packets are retransmitted before the queue becomes full.

Returning to FIG. 1, when a request for a flow of data arrives, it defines the two endpoints. In the example of FIG. 1, there is a request to transmit data from a sender S to a receiver V. The two endpoints are node A (the first receiver for sender S) and node R (the final transmitter for receiver V).

As data travels from endpoint sender S to endpoint receiver V, a path is defined between nodes within the network. The path is along various nodes of the network. In the example of FIG. 1, a path 150 is defined via nodes A, E, J, N, R of network 120.

The diagram of FIG. 1 is simplified, in that it shows data flowing only one way. In many instances, however, there is also a return path for the data to flow in the reverse way, such as for two-way telephone and video conferences. The return path may or may not be the same as path 150.

The so-called routing problem is to decide which nodes the data flow should be routed through. The routing problem is solved by routing algorithms. Such algorithms are addressed by a body called the Internet Engineering Task Force (IETF). At the time of the original filing of this document with the U.S.A. Patent Office, the IETF maintains a website at <www.ietf.org>.

Within the context of IETF, document RFC-2386 points out that routing may be based on considerations such as Quality-of-Service (QoS). QoS is a set of service requirements that are to be met by the network while transporting a data flow. Such service requirements include delay and available bandwidth.

Accordingly, QoS-based routing is a routing mechanism under which paths for flows are determined based on some knowledge of resource availability in the network, as well as the QoS requirement of flows. The resource availability includes metrics also for delay and available bandwidth.

Present plans to implement QoS based routing intend to account for various QoS metrics, for example bandwidth, delay, and packet loss.

Traditionally packet loss is measured in the prior art as simply a rate W, from Equation (1):

$$W = (\text{\# of lost packets})/(\text{total \# of packets}) \qquad \text{Equation (1)}$$

Rate W is determined by counting total numbers of packets, in gross quantities. Then W is imparted in the QoS computation. The higher the W, the lower the computed quality of service (QoS).

Packet loss at a node is now described in more detail. It will be appreciated that packet loss is intimately associated with congestion at a node.

Referring again to FIG. 2, if node N is congested, more packets will arrive than the queue 230 has capacity for. In that case, the additional packets are discarded ("lost", or "dropped").

Referring now to FIG. 3, a diagram is shown of packets received sequentially at the router of FIG. 2. Those stored and retransmitted are shown as clear, while those dropped are shown with an "X" through them.

Losing discarded packets due to network congestion is an expected occurrence. There have been successfully implemented backup measures, in at least two main types of situations.

In the first type, protocols that require all packets to be sent have a backup measure for ensuring that each packet has been sent. When a packet is discarded, its loss is traced, and the packet is sent again. This results in duplication of effort, because the packet was routed to a congested node in the first place.

In the second type, real time transmission protocols tolerate losing discarded packets. These protocols include applications for Voice over Internet Protocol ("VoIP") and Video over IP. Packets that are lost will be replicated by redundancy algorithms, to conceal the lost packets. These only work decreasingly well, as more packets are lost.

Addressing packet loss for QoS only in terms of the W of Equation (1) is inadequate. That is because the computation of Equation (1) makes an assumption that packets will be lost uniformly in time.

That is not true, however. Packet loss is not distributed uniformly in time, but it tends to come in bursts, or groups, which affect perceived quality of service disproportionately. While the burstiness or uniformity affects the average W of equation (1) only a little, it affects the network performance more dramatically.

In the first type of situations, it may be less wasteful when whole groups of packets are retransmitted due to loss, instead of a few packets here and there.

In the second type of situations, the resulting quality of the reconstructed image and/or voice will be affected. That is because packet loss concealment algorithms work far better when packet loss is uniform than bursty.

BRIEF SUMMARY OF THE INVENTION

The present invention overcomes these problems and limitations of the prior art.

Generally, the present invention provides devices, softwares, and methods for quantifying a burstiness quality of the packet loss in the node of a path. The quantified burstiness becomes a metric for determining the Quality of Service (QoS) offered by a node in retransmitting data through a network. The burstiness statistic may be lengths of episodes of sequentially discarded packets at the node.

Network routing is thus made according to the more insightfully determined QoS. Accordingly, the resulting routing yields a consistent quality of service.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides devices, software, and methods for quantifying a burstiness quality of packet losses. The burstiness is also thought of as grouping, or clustering patterns of the lost packets. The burstiness is quantified as a statistic, then optionally as a figure of merit, which becomes part of the computed Quality of Service offered by a node in retransmitting data through a network. The invention is now described in more detail.

Figure 4:
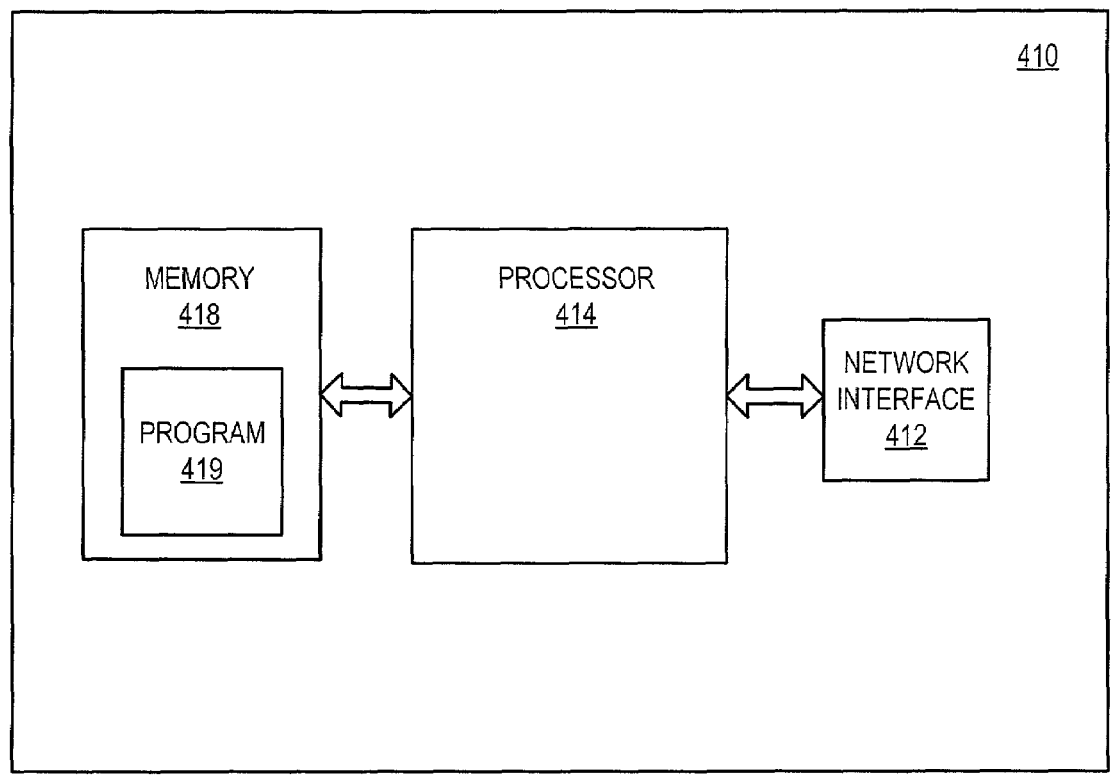
FIG. 4 is a block diagram of a device made according to an embodiment of the invention.

Referring now to FIG. 4, a device 410 made according to an embodiment of the invention is described in more detail. Device 410 may be any network device that performs routing, whether it is situated in a network or not.

Device 410 has a network interface 412 for interfacing with the network. Device 410 also has a processor 414 coupled with network interface 412. Processor 414 may be implemented as a Digital Signal Processor (DSP), Central Processing Unit (CPU), or any other equivalent way known in the art.

Device 410 may additionally include a memory 418, which is also called a packet queue. A program 419 may also reside on memory 418. Functions of processor 414 may be controlled by program 419, as will become apparent from the below.

The present invention may be implemented by one or more devices that include logic circuitry. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between the method of the invention itself and the method of operating a computing machine. The present invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software and softwares. This is not necessary, however, and there may be cases where modules are equivalently aggregated into a single program, with sometimes unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

It will be appreciated that some of these methods may include software steps which may be performed by different modules of an overall parts of a software architecture. For example, data forwarding in a router may be performed in a data plane, which consults a local routing table. Collection of performance data may also be performed in a data plane. The performance data may be processed, and accordingly used in a control plane to update the local routing table, in addition to neighboring ones. A person skilled in the art will discern which step is best performed in which plane.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Figure 5:
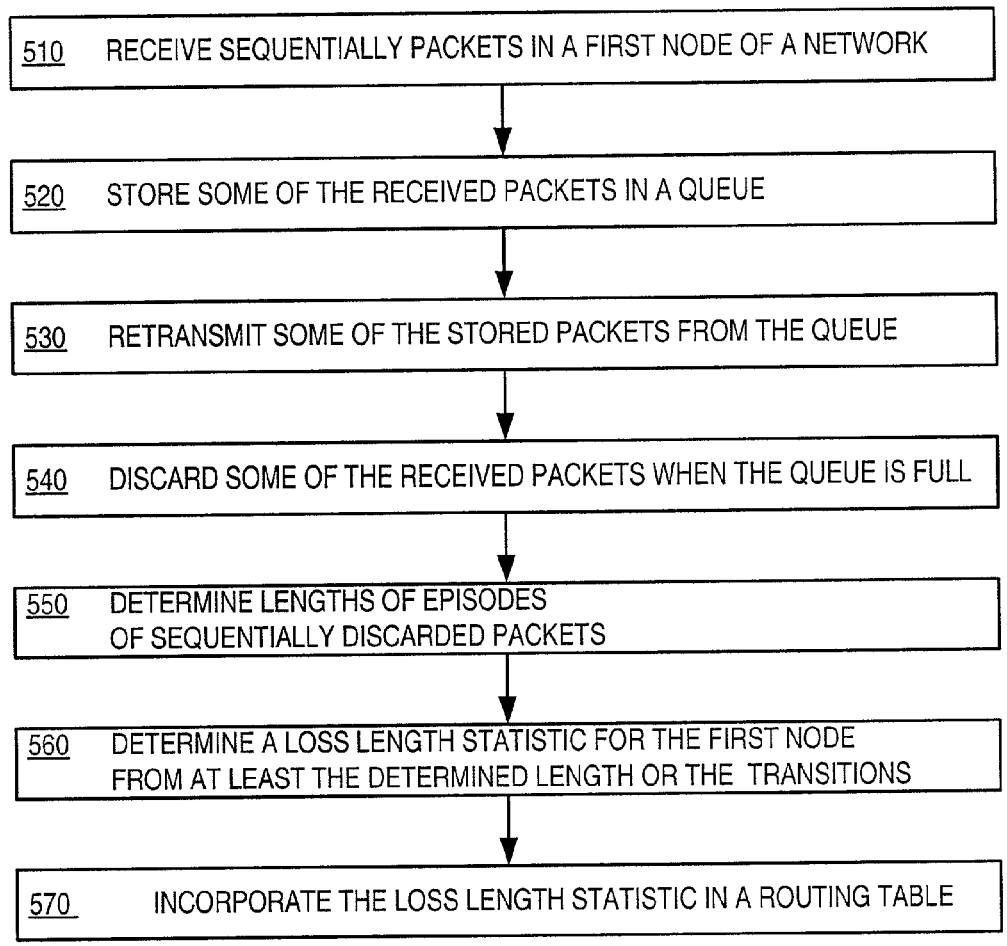
FIG. 5 is a flowchart illustrating a method according to an embodiment of the present invention.

Referring now to FIG. 5, a flowchart 500 is used to illustrate a method according to an embodiment of the invention. The method of flowchart 500 may also be practiced by device 410, or any other device or combination of devices that perform routing.

According to a box 510, data packets are received in a first node of a network for retransmission. The received data packets are received sequentially, and can be from any source.

According to an optional next box 520, some of the received packets are stored in a queue. Alternately, it may be in more than one queue.

According to an optional next box 530, at least some of the received packets are retransmitted from the queue.

According to a next box 540, some of the received packets are discarded when the queue is full. These packets are typically discarded before they are stored in the queue. Other times, some of the received packets are discarded merely when the queue has filled up to a preset threshold. If more than one queue is used, they may have different thresholds.

According to a next box 550, lengths are determined of respective episodes of sequentially lost packets. This may be accomplished in a number of ways. In one case, the length is merely counted as the number of packets.

In another embodiment, the loss length statistic may be computed by the mathematical model known as Markov two-state chain. In this case, "bad" states are defined for all the dropped packets, and "good" states are defined for all the other received packets. Then it is determined when there are transitions in the sequentially received packets between the good states and the bad states. Then the transitions are counted. In that case, the lengths of box 550 may be determined from the numbers of the transitions.

According to another box 560, a loss length statistic is determined for the first node. In some embodiments, the loss length statistic is determined from at least the lengths determined in box 550.

The loss length statistic may be any such useful statistic. As an example, it may be an average duration of episodes of contiguously lost packets, a variance of such a duration, a maximum such duration, etc. In addition, using more than one statistic will yield more accurate results.

The loss length statistic may alternately be determined from a table lookup, using at least one collateral parameter. One such collateral parameter may be a residual bandwidth.

In the event that transitions are being counted as per the Markov two-state chain, the loss length statistic may be determined from numbers of transitions between the good states and the bad states. It should be noted that other statistics may also be computed from these numbers of transitions, such as averages, etc.

According to a next box 570, the loss length statistic is incorporated in a routing table. This can be a local routing table. Subsequent routing will therefore be improved because the resulting routing table will include a QoS metric for the burstiness of packet loss.

The above is an example of just one node. This can be generalized to all the nodes of a path. In such a case, respective loss length statistics may be determined for each of the other path nodes. In addition, a combined figure of merit is computed from the determined loss length statistics for all the nodes of the first path.

Accordingly, a combined burstiness statistic ('q-path') for the entire path may be a function of the individual burstiness of the nodes (or interfaces) A, E, J, N, R. That would be as follows:

$$q\text{-}path(150)=f(q\text{-}int[A],q\text{-}int[E],\\ q\text{-}int[J],q\text{-}int[N],q\text{-}int[R]) \quad \text{Equation (2)}$$

Moreover, combined burstiness statistics of different paths may be compared to each other. The path chosen would have the optimum burstiness statistic. Or they may be compared to a preset minimum. The path chosen could be the first one that meets the preset minimum, or the one that exceeds it by the least amount (to conserve bandwidth).

Furthermore, a combined burstiness statistic may be computed for other paths. For each, a total QoS is derived. The QoS of different paths may be compared, and the optimum selected. Or the first path whose QoS is found to exceed a preset minimum may be chosen. Alternately, the path may be chosen whose QoS exceed the preset minimum by the least amount, to conserve bandwidth.

As an example only, a link state protocol can be used with the q-int[(node)] parameters for the above.

Figure 1:
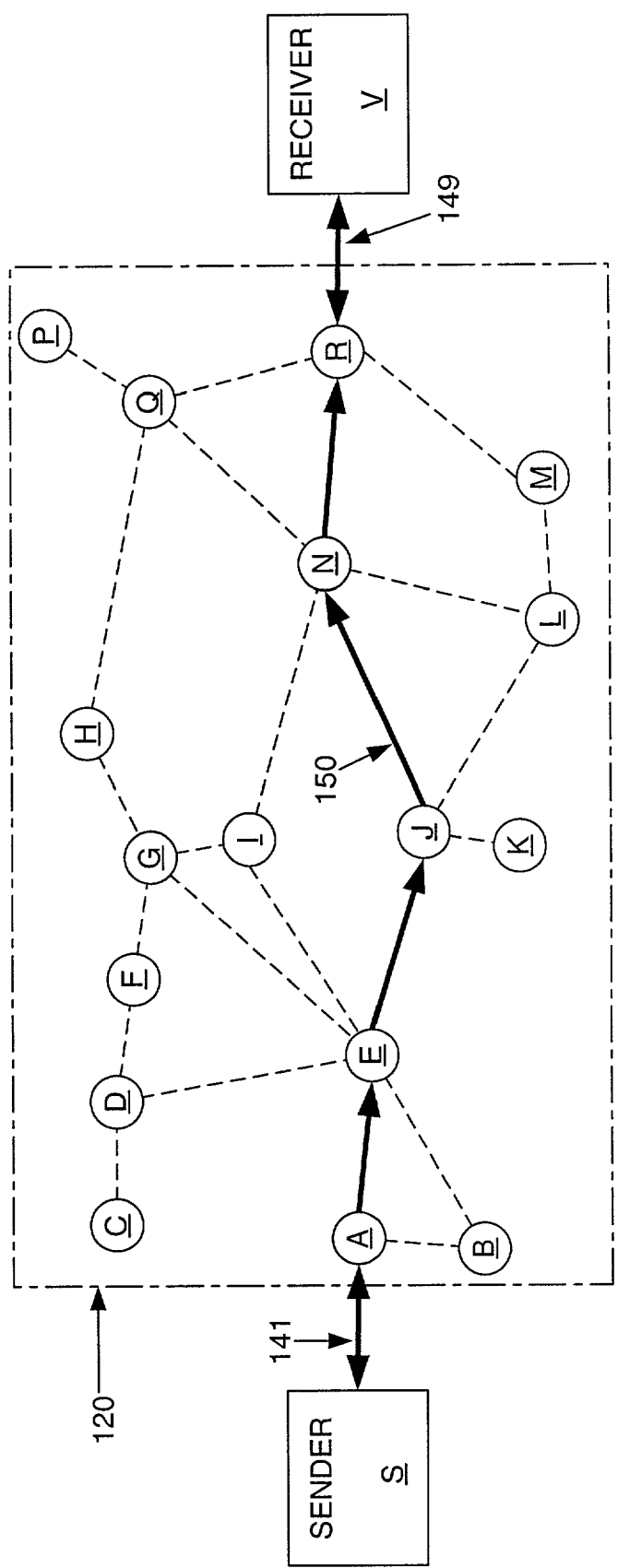
FIG. 1 is a network diagram showing a path through a network configured by a routing algorithm in the prior art for transmitting a data flow.
Figure 2:
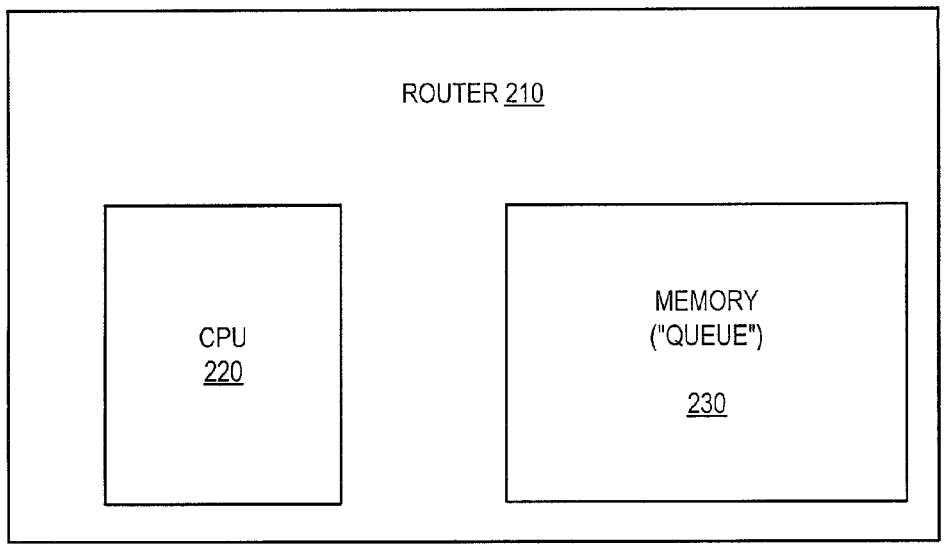
FIG. 2 is a block diagram of a router in node N of FIG. 1.
Figure 3:
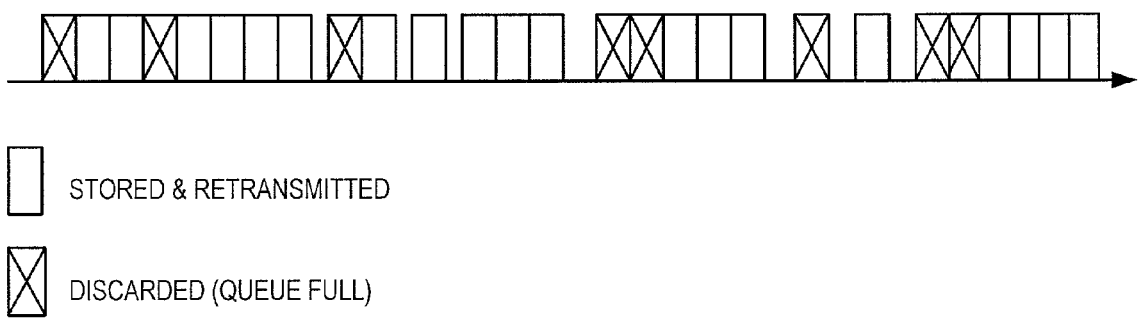
FIG. 3 is a diagram of a sequence of packets received at the router of FIG. 2.
Figure 6:
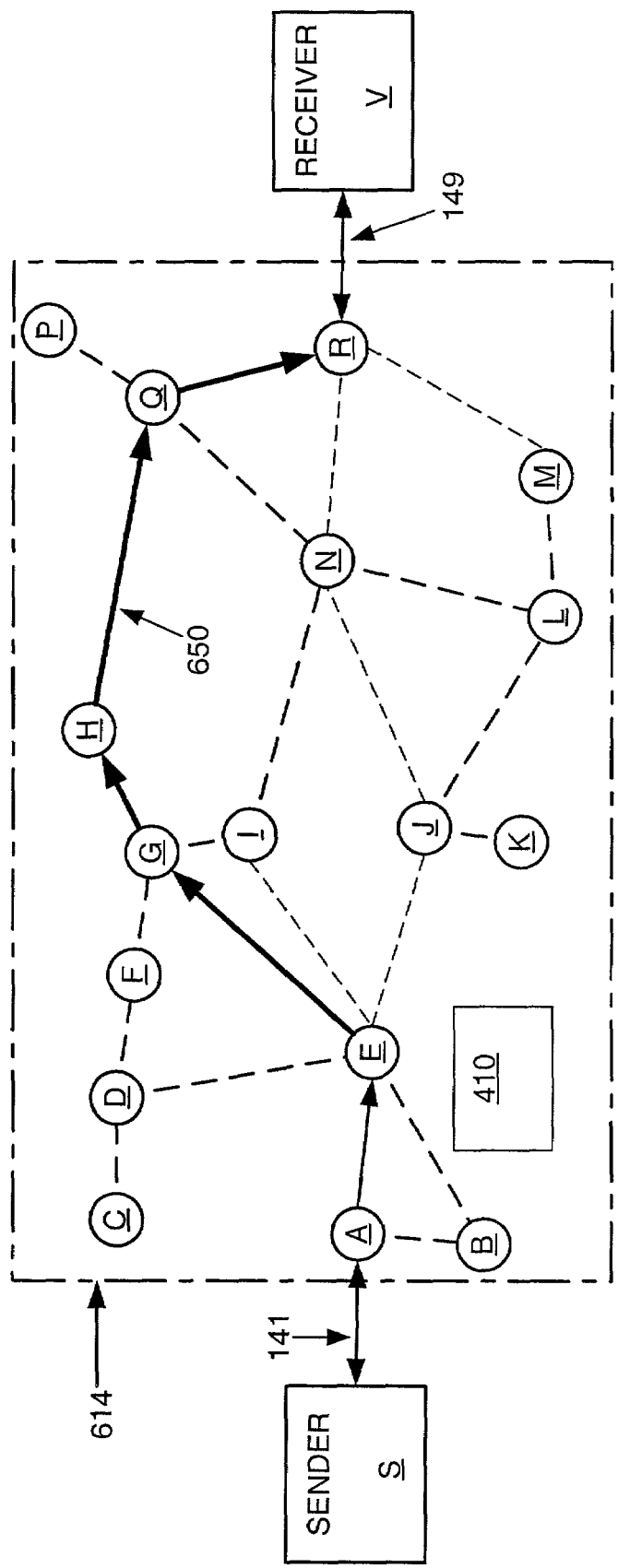
FIG. 6 is the network diagram of FIG. 1, further improved according to the invention.

Referring now to FIG. 6, a network 614 is shown. It will be recognized that network 614 is the same as the network 120 of FIG. 1, as resulting after the introduction of device 410 of FIG. 4. Device 410 may be situated anywhere in network 614, including in one of its nodes.

A different routing can be seen in network 614, through path 650. Path 650 goes through nodes A, E, G, H, Q, R. After node E, the QoS grades computed according to the invention result in routing through node G, instead. This way, congested node N is avoided. Accordingly, the user enjoys a better QoS, even though the new path 650 may go through more nodes ("hops") than path 150.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A device comprising:
a network interface for coupling to a network; and
a processor coupled with the network interface, in which the processor is adapted to
receive packets in a first node of a network;
store some of the received packets in a queue;
retransmit some of the stored packets from the queue;
discard some of the received packets when the queue has filled up to a preset threshold;
determine lengths of respective pluralities of episodes of sequentially discarded packets;
determine a loss length statistic for the first node from at least the determined lengths; and
incorporate the loss length statistic in a routing table.

2. The device of claim 1, in which
the loss length statistic is the number of sequentially discarded packets.

3. The device of claim 1, in which
the loss length statistic is an average duration of episodes of sequentially discarded packets.

4. The device of claim 1, in which
the loss length statistic is a variance in a duration of episodes of sequentially discarded packets.

5. The device of claim 1, in which
the loss length statistic is a maximum duration of episodes of sequentially discarded packets.

6. The device of claim 1, in which the processor is further adapted to:
compare the loss length statistic to a preset minimum.

7. The device of claim 1, in which the processor is further adapted to:
compute a figure of merit from the loss length statistic for the first node.

8. The device of claim 1, in which the processor is further adapted to:
define bad states that correspond to the discarded packets and good states that correspond to all other received packets;
determine when there are transitions in the sequentially received packets between the good states and the bad states; and
counting numbers of the transitions, and in which the lengths are determined from the counted numbers of transitions.

9. The device of claim 1, in which the processor is further adapted to:
look up a collateral parameter from a table,
and in which the loss length statistic is determined also from the collateral parameter.

10. The device of claim 9, in which
the collateral parameter is a residual bandwidth.

11. The device of claim 1, in which the processor is further adapted to:
determine a loss length statistic for a second node about packets discarded at the second node.

12. The device of claim 11, in which the processor is further adapted to:
compare the loss length statistic for the second node to that of the first node.

13. The device of claim 11, in which the processor is further adapted to:
compare the loss length statistic for the second node to a preset minimum.

14. The device of claim 11, in which the processor is further adapted to:
combine the loss length statistic for the second node with the loss length statistic for the first node to determine an aggregate loss length statistic for a first path.

15. The device of claim 14, in which the processor is further adapted to:
compare the aggregate loss length statistic to a preset minimum.

16. The device of claim 14, in which the processor is further adapted to:
determine an aggregate loss length statistic for a second path.

17. The device of claim 16, in which the processor is further adapted to:
compare the aggregate loss length statistic for the second path to that of the first path.

18. The device of claim 16, in which the processor is further adapted to:
compare the aggregate loss length statistic for the second path to a preset minimum.

19. A device comprising:
means for receiving packets in a first node of a network;
means for storing some of the received packets in a queue;
means for retransmitting some of the stored packets from the queue;
means for discarding some of the received packets when the queue has filled up to a preset threshold;
means for determining lengths of respective pluralities of episodes of sequentially discarded packets;
means for determining a loss length statistic for the first node from at least the determined lengths; and
means for incorporating the loss length statistic in a routing table.

20. The device of claim 19, in which
the loss length statistic is the number of sequentially discarded packets.

21. The device of claim 19, in which
the loss length statistic is an average duration of episodes of sequentially discarded packets.

22. The device of claim 19, in which
the loss length statistic is a variance in a duration of episodes of sequentially discarded packets.

23. The device of claim 19, in which
the loss length statistic is a maximum duration of episodes of sequentially discarded packets.

24. The device of claim 19, further comprising:
means for comparing the loss length statistic to a preset minimum.

25. The device of claim 19, further comprising:
means for computing a figure of merit from the loss length statistic for the first node.

26. The device of claim 19, further comprising:
means for defining bad states that correspond to the discarded packets and good states that correspond to all other received packets;
means for determining when there are transitions in the sequentially received packets between the good states and the bad states; and means for counting numbers of the transitions,
and in which the lengths are determined from the counted numbers of transitions.

27. The device of claim 19, further comprising:
means for looking up a collateral parameter from a table,
and in which the loss length statistic is determined also from the collateral parameter.

28. The device of claim 27, in which
the collateral parameter is a residual bandwidth.

29. The device of claim 19, further comprising:
means for determining a loss length statistic for a second node about packets discarded at the second node.

30. The device of claim 29, further comprising:
means for comparing the loss length statistic for the second node to that of the first node.

31. The device of claim 29, further comprising:
means for comparing the loss length statistic for the second node to a preset minimum.

32. The device of claim 29, further comprising:
means for combining the loss length statistic for the second node with the loss length statistic for the first node to determine an aggregate loss length statistic for a first path.

33. The device of claim 32, further comprising:
means for comparing the aggregate loss length statistic to a preset minimum.

34. The device of claim 32, further comprising:
means for determining an aggregate loss length statistic for a second path.

35. The device of claim 34, further comprising:
means for comparing the aggregate loss length statistic for the second path to that of the first path.

36. The device of claim 34, further comprising:
means for comparing the aggregate loss length statistic for the second path to a preset minimum.

37. An article comprising: a storage medium, the storage medium having instructions stored thereon, in which when the instructions are executed by at least one device, they result in:
receiving packets in a first node of a network;
storing some of the received packets in a queue;
retransmitting some of the stored packets from the queue;
discarding some of the received packets when the queue has filled up to a preset threshold;
determining lengths of respective pluralities of episodes of sequentially discarded packets;
determining a loss length statistic for the first node from at least the determined lengths; and
incorporating the loss length statistic in a routing table.

38. The article of claim 37, in which
the loss length statistic is the number of sequentially discarded packets.

39. The article of claim 37, in which
the loss length statistic is an average duration of episodes of sequentially discarded packets.

40. The article of claim 37, in which
the loss length statistic is a variance in a duration of episodes of sequentially discarded packets.

41. The article of claim 37, in which
the loss length statistic is a maximum duration of episodes of sequentially discarded packets.

42. The article of claim 37, in which the instructions further result in:
comparing the loss length statistic to a preset minimum.

43. The article of claim 37, in which the instructions further result in:
computing a figure of merit from the loss length statistic for the first node.

44. The article of claim 37, in which the instructions further result in:
defining bad states that correspond to the discarded packets and good states that correspond to all other received packets;
determining when there are transitions in the sequentially received packets between the good states and the bad states; and
counting numbers of the transitions,
and in which the lengths are determined from the counted numbers of transitions.

45. The article of claim 37, in which the instructions further result in:
looking up a collateral parameter from a table,
and in which the loss length statistic is determined also from the collateral parameter.

46. The article of claim 45, in which
the collateral parameter is a residual bandwidth.

47. The article of claim 37, in which the instructions further result in:
determining a loss length statistic for a second node about packets discarded at the second node.

48. The article of claim 47, in which the instructions further result in:
comparing the loss length statistic for the second node to that of the first node.

49. The article of claim 47, in which the instructions further result in:
comparing the loss length statistic for the second node to a preset minimum.

50. The article of claim 47, in which the instructions further result in:
combining the loss length statistic for the second node with the loss length statistic for the first node to determine an aggregate loss length statistic for a first path.

51. The article of claim 50, in which the instructions further result in:
comparing the aggregate loss length statistic to a preset minimum.

52. The article of claim 50, in which the instructions further result in:
determining an aggregate loss length statistic for a second path.

53. The article of claim 52, in which the instructions further result in:
comparing the aggregate loss length statistic for the second path to that of the first path.

54. The article of claim 52, in which the instructions further result in:
comparing the aggregate loss length statistic for the second path to a preset minimum.

55. A method comprising:
receiving packets in a first node of a network;
storing some of the received packets in a queue;
retransmitting some of the stored packets from the queue;
discarding some of the received packets when the queue has filled up to a preset threshold;
determining lengths of respective pluralities of episodes of sequentially discarded packets;
determining a loss length statistic for the first node from at least the determined lengths; and
incorporating the loss length statistic in a routing table.

56. The method of claim 55, in which
the loss length statistic is the number of sequentially discarded packets.

57. The method of claim 55, in which
the loss length statistic is an average duration of episodes of sequentially discarded packets.

58. The method of claim 55, in which
the loss length statistic is a variance in a duration of episodes of sequentially discarded packets.

59. The method of claim 55, in which
the loss length statistic is a maximum duration of episodes of sequentially discarded packets.

60. The method of claim 55, further comprising:
comparing the loss length statistic to a preset minimum.

61. The method of claim 55, further comprising:
computing a figure of merit from the loss length statistic for the first node.

62. The method of claim 55, further comprising:
defining bad states that correspond to the discarded packets and good states that correspond to all other received packets;
determining when there are transitions in the sequentially received packets between the good states and the bad states; and
counting numbers of the transitions,
and in which the lengths are determined from the counted numbers of transitions.

63. The method of claim 55, further comprising:
looking up a collateral parameter from a table,
and in which the loss length statistic is determined also from the collateral parameter.

64. The method of claim 63, in which
the collateral parameter is a residual bandwidth.

65. The method of claim 55, further comprising:
determining a loss length statistic for a second node about packets discarded at the second node.

66. The method of claim 65, further comprising:
comparing the loss length statistic for the second node to that of the first node.

67. The method of claim 65, further comprising:
comparing the loss length statistic for the second node to a preset minimum.

68. The method of claim 65, further comprising:
combining the loss length statistic for the second node with the loss length statistic for the first node to determine an aggregate loss length statistic for a first path.

69. The method of claim 68, further comprising:
comparing the aggregate loss length statistic to a preset minimum.

70. The method of claim 68, further comprising:
determining an aggregate loss length statistic for a second path.

71. The method of claim 70, further comprising:
comparing the aggregate loss length statistic for the second path to that of the first path.

72. The method of claim 70, further comprising:
comparing the aggregate loss length statistic for the second path to a preset minimum.

* * * * *

UNITED STATES PATENT AND TRADEMARK OFFICE
CERTIFICATE OF CORRECTION

| | | |
|---|---|---|
| PATENT NO. | : 6,999,417 B1 | Page 1 of 1 |
| APPLICATION NO. | : 09/998866 | |
| DATED | : February 14, 2006 | |
| INVENTOR(S) | : Graham et al. | |

It is certified that error appears in the above-identified patent and that said Letters Patent is hereby corrected as shown below:

At column 1, line 24, please replace "at node of" with --at node in--.

Signed and Sealed this

Eighth Day of May, 2007

JON W. DUDAS
*Director of the United States Patent and Trademark Office*